(12) United States Patent
Grayson et al.

(10) Patent No.: US 8,705,738 B2
(45) Date of Patent: Apr. 22, 2014

(54) SELECTIVE SECURITY TERMINATION IN NEXT GENERATION MOBILE NETWORKS

(75) Inventors: Mark Grayson, Maidenhead (GB); Vojislav Vucetic, Holmdel, NJ (US)

(73) Assignee: Cisco Technology, Inc., San Jose, CA (US)

( * ) Notice: Subject to any disclaimer, the term of this patent is extended or adjusted under 35 U.S.C. 154(b) by 1553 days.

(21) Appl. No.: 11/864,201

(22) Filed: Sep. 28, 2007

(65) Prior Publication Data

US 2009/0086971 A1 Apr. 2, 2009

(51) Int. Cl.
*H04L 9/00* (2006.01)
(52) U.S. Cl.
USPC ............. 380/247; 380/44; 380/258; 380/279; 713/153; 713/168
(58) Field of Classification Search
None
See application file for complete search history.

(56) References Cited

U.S. PATENT DOCUMENTS

| | | | | |
|---|---|---|---|---|
| 5,781,628 | A * | 7/1998 | Alperovich et al. | 380/258 |
| 6,671,377 | B1 * | 12/2003 | Havinis et al. | 380/258 |
| 7,111,162 | B1 | 9/2006 | Bagepalli et al. | |
| 2002/0049902 | A1 | 4/2002 | Rhodes | |
| 2002/0066011 | A1 * | 5/2002 | Vialen et al. | 713/150 |
| 2006/0030333 | A1 * | 2/2006 | Ward et al. | 455/456.1 |
| 2006/0274643 | A1 * | 12/2006 | Choyi et al. | 370/216 |
| 2006/0281471 | A1 * | 12/2006 | Shaffer et al. | 455/456.2 |
| 2007/0032225 | A1 * | 2/2007 | Konicek et al. | 455/417 |
| 2007/0147616 | A1 * | 6/2007 | Hamalainen et al. | 380/270 |
| 2008/0013737 | A1 * | 1/2008 | Sowa et al. | 380/278 |

FOREIGN PATENT DOCUMENTS

| | | |
|---|---|---|
| CN | 1917680 A | 2/2007 |
| WO | WO-2009045825 A2 | 4/2009 |

OTHER PUBLICATIONS

Liao et al. "A Location-Dependent Data Encryption Approach for Enhancing Mobile information System", ICAC, Feb. 2007.*
"European Application Serial No. 08834831.3 Response filed Jun. 30, 2010 to International Search Report and Written Opinion mailed May 20, 2010", 11 pgs.
International Application Serial No. PCT/US2008/077607, Search Report mailed Mar. 25, 2009, 5 pgs.
International Application Serial No. PCT/US2008/077607, Written Opinion mailed Mar. 25, 2009, 5 pgs.
*Universal Mobile Telecommunications System; 3G security; Security architecture (3GPP TS 33.102 version 5.7.0 Release 5)*, Technical Specification, Reference No. RTS/TSGS-0333102v570, European Telecommunications Standards Institute (ETSI), (Dec. 2005) 64 pgs.
Paolini, M., "", *Building End-to-End WiMAX Networks*, White Paper, Senza Fili Consulting, (Apr. 2007), 8 pgs.

(Continued)

*Primary Examiner* — Shewaye Gelagay
(74) *Attorney, Agent, or Firm* — Schwegman Lundberg & Woessner, P.A.

(57) ABSTRACT

Systems and/or methods of selectively terminating security in mobile networks are presented. User equipment (UE) can specify cipher termination location capabilities for encrypting/decrypting data packets to a base station in a mobile network. The mobile network can subsequently determine at which node in the network to terminate the cipher in part according to the capabilities provided and deliver the determined location to the UE. The determined cipher termination location can be provided in response to a request to initiate communications, the initial request can specify the capabilities. The UE can utilize the location to support disparate types of networks and to intelligently deal with hand-offs and other functions of the mobile network.

28 Claims, 11 Drawing Sheets

(56) References Cited

OTHER PUBLICATIONS

"European Application Serial No. 08834831.3, Examiner Notification mailed Feb. 14, 2011", 4 Pgs.

"Chinese Application Serial No. 200880109175.9, Office Action mailed Aug. 3, 2012", with English translation of claims, 12 pgs.

"International Application Serial No. PCT/US2008/077607, International Preliminary Report on Patentability mailed Apr. 8, 2010", 8 pgs.

"Chinese Application Serial No. 200880109175.9, Office Action mailed Apr. 28, 2013", with English translation of claims, 9 pgs.

"Chinese Application Serial No. 200880109175.9, Response filed Dec. 18, 2012 to Office Action mailed Aug. 3, 2012", with English translation of claims, 12 pgs.

European Application Serial No. 08834831.3, Office Action Response filed Jun. 24, 2011, 13 pgs.

\* cited by examiner

SELECTIVE SECURITY TERMINATION IN NEXT GENERATION MOBILE NETWORKS

BACKGROUND

Mobile communications and the Internet are two fields that have developed by leaps and bounds in the past. In this development, the two fields seem to have grown in different directions as different ideas; however, the Internet has become a communication system in many respects, facilitating high-quality audio and even video conferencing. To this end, the Internet has begun to converge into the telephony/voice communication realm. Likewise, telephony begun to converge into the information world once dominated by Internet technologies by offering wireless mobile devices that can access the Internet. Due to disparities in the two technologies, networks are developing from each end to accommodate communication with the other end.

One such network is Third generation (3G) wide area cellular phone networks, which offers robust functionality, such as broadband wireless data access in addition to the wide-area cellular phone service, etc. Some underlying structural improvements exist in the network as well, such as encryption. Where previous cellular phone networks terminated ciphering at the base station (thereby encrypting voice only from the handset to the base station, offering an infiltration point for malicious users at the base station), 3G pushes the cipher termination into a more centralized node of the network providing increased security. Worldwide Interoperability for Microwave Access (WiMAX, based upon IEEE Standard 802.16) is another broadband wireless access solution that has emerged, which involves deploying wireless metropolitan area networks (WMAN) to create wireless access environments having service spans of up to 31 miles. WiMAX also offers operability with cellular phones to provide voice service over the Internet as well, such as voice over Internet protocol (VoIP). WiMAX utilizes extensible authentication protocol (EAP) to deliver packets from a device, such as a handset, all the way through to the home network, typically by tunneling end-to-end using authentication, authorization, and accounting (AAA) protocol, thus terminating ciphering at the base station since the AAA protocol can protect the data within the WiMAX core network.

DESCRIPTION OF EXAMPLE EMBODIMENTS

Overview

Figure 1:
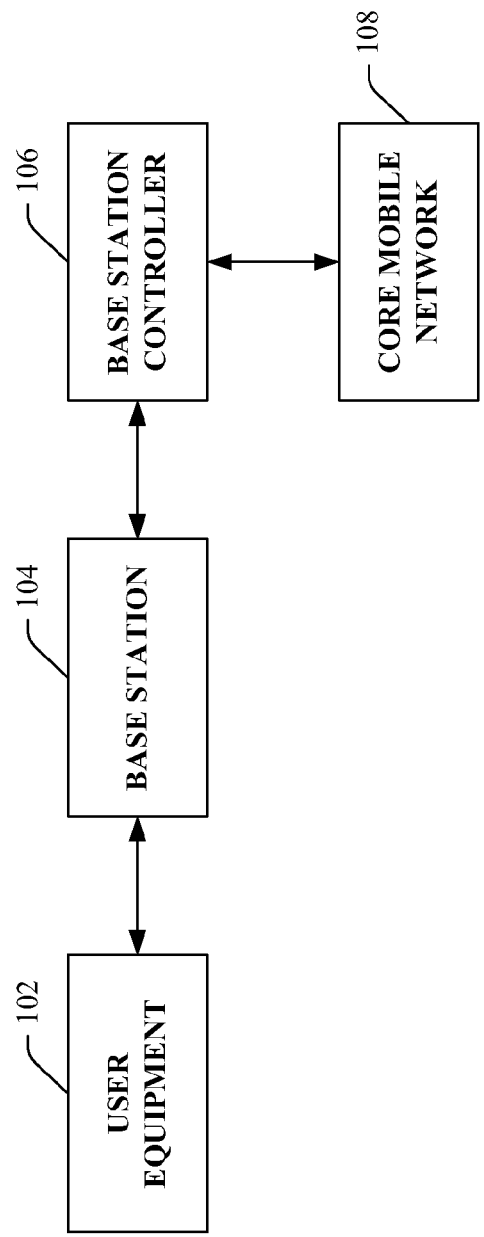
FIG. 1 illustrates an example system that facilitates selectively terminating mobile network security in accordance with an embodiment.

The following presents a simplified overview of the specification in order to provide a basic understanding of some aspects of the technology. This overview is not an extensive overview of the subject disclosure. It is not intended to identify key/critical elements of the subject disclosure or to delineate the scope of the technology. Its sole purpose is to present some concepts of the technology in a simplified form as a prelude to the more detailed description that is presented later.

The technology disclosed herein, in one embodiment thereof, comprises cipher capability and location components operating at disparate nodes in a mobile network, where the nodes can determine at which point in the network ciphering will terminate. For example, user equipment (UE), such as a handset, can comprise the cipher capability component that can determine points of cipher termination the UE can handle, and a node in the mobile network can comprise the cipher location component. The UE can initiate conversation with the mobile network by initially sending a request for communication message; the message can comprise information regarding the capability of one or more cipher termination locations with respect to the UE. The cipher location component node of the mobile network (or a node comprising the component or functionality thereof, for example) can choose a termination location for the cipher in the mobile network based on the UE capability. Additionally, other factors can be taken into account when making the decision, such as a mobile network preference, a UE preference, a previous configuration of the UE (such as in a different mobile network or a disparate base station in the same or different network), and the like. When the location is determined, the mobile network can send a message back to the UE comprising information about the chosen cipher termination location. Subsequently, communication between the UE and the mobile network can commence as normal.

In another embodiment, the UE can communicate with, and be handed-off between, mobile networks of disparate architectures having disparate cipher termination locations. Thus, the UE can provide its capabilities to an available mobile network, and if the mobile network can terminate a cipher in a compatible location of the UE, the two nodes can communicate.

In still another embodiment of the disclosed subject matter, the cipher termination location can be used by the UE to determine steps necessary for hand-off to another base station when in mobile mode, for example. When handing-off from one base station to the next, if ciphering is terminated at a node more central than the new base station, for example, and the old base station had the same centralized termination point, the UE can determine that renegotiation of the cipher is not necessary in the new location. Where the cipher is centralized or the UE is being handed-off to a network of different architecture/cipher termination location, the UE can know to renegotiate the cipher and commence or continue communication.

To the accomplishment of the foregoing and related ends, certain illustrative aspects are described herein in connection with the following description and the annexed drawings. These aspects are indicative, however, of but a few of the various ways in which the principles of the technology can be employed and the subject specification is intended to include all such aspects and their equivalents. Other advantages and features of the technology will become apparent from the following detailed description when considered in conjunction with the drawings.

Example Embodiments

The technology is now described with reference to the drawings, wherein like reference numerals are used to refer to like elements throughout. In the following description, for purposes of explanation, numerous specific details are set forth in order to provide a thorough understanding of the features and functionality. It may be evident, however, that the technology can be practiced without these specific details. In other instances, well-known structures and devices are shown in block diagram form in order to facilitate describing the features and functionality.

Due to differences in underlying policies and technologies, mobile network architectures have diverged in some regards. Specifically, networks such as Worldwide Interoperability for Microwave Access (WiMAX) terminate ciphering at the base station level to provide distribution of the termination (having at least the advantage of letting devices and base stations define their own encryption schemes). By virtue of its design, WiMAX has the ability to depend on other security measures to protect data from the base station to a controller and/or other components of the mobile network. One such protection is to employ secondary security functionality in order to protect the links between the base station and a more centralized location. On the other hand, third generation (3G) networks terminate user plane ciphering at a centralized location in the network to ensure encryption integrity until the data hits a more centralized node in the network, such as a radio network controller. One view is that since base stations are becoming smaller and more common-place with respect to location (e.g. outdoors, on top of buildings, etc.) and distribution (plans to develop customer premises equipment (CPE) base stations for access in the home), the integrity of the base station will be challenged in the future as access to the physical station can aid in manipulation of the data transmitted thereto. The disparate policies and architectures, however, have created a compatibility void for mobile user equipment (UE), such as handsets.

Selective security termination is disclosed, which can address the compatibility void. Further advantages will become apparent through various embodiments described herein. Communication protocols of the disparate mobile networks can be modified to include selective security data to facilitate this end. For example, a UE can send a request to initiate communications with a base station of a mobile network (such as a 3G or WiMAX network, for example) and specify ciphering capabilities of the UE—this can be done by a ciphering capability component within the UE, for instance. Upon receiving the request, the base station and/or mobile network can send back a response with the ciphering location—this can be determined by a cipher location component in the mobile network, for instance. It is to be appreciated that this communication can occur at different points on a communication timeline between the UE and base station. In one embodiment, the ciphering capability is specified in the initial request for communication sent from the UE to the base station; then the ciphering location is determined by the mobile network and sent back to the UE along with the user authentication request. The UE stores the termination location for later use and continues with the authentication process.

Referring to the drawings, FIG. 1 illustrates an example system 100 that facilitates selective mobile network security termination in accordance with an embodiment. More particularly, the system 100 can include a UE 102 that communicates with the mobile network to receive voice and/or data information service, a base station 104 that communicates directly with the UE 102 through a transmission medium such as cellular technology, a base station controller 106 that manages a plurality of base stations (such as base station 104, for one) and communication thereto, and a core mobile network 108 comprising the core central components (not shown) of the mobile network that facilitate data accessing and retrieval.

The UE 102 can be a mobile and/or stationary device equipped to communicate with a mobile network such as a handset (e.g. a cellular phone), computer/Personal Digital Assistant (PDA), or substantially any device having mobile network communication ability, such as a digital video recorder (DVR), for example, or perhaps a camera, alarm system, home management system, etc. The UE 102 can request communication with a mobile network base station 104 by sending an initialization packet; the packet can specify cipher termination location capabilities of the UE 102. Additionally, the UE 102 can specify whether selective cipher termination location is even supported by the UE 102 in the first place. This provides for UEs 102 of multiple versions and/or types that are compatible with cipher termination at a plurality of locations within the network. Upon initiating communication with the base station 104, the cipher termination location capabilities of the UE 102 can be evaluated and a decision made as to the location of the cipher termination in communications between the UE 102 and the base station 104. It is to be appreciated that the base station 104 can perform this logic or other components of the network; for example, the base station 104 can communicate with the base station controller 106, which can send the request to the core mobile network 108, and the core network component 108 can determine the cipher termination location and send the information back with an authentication request, for example. Additionally, the base station 104 or other core network component can indicate if the feature is even supported or not from the mobile network as well.

In one embodiment, the cipher termination location can be determined based on the network to which the UE 102 is connected (e.g. home or visited); moreover, it can be specified by an order of preference, for example, where the UE 102 can initially specify preferred locations. In addition, the cipher termination location can be determined by a previous location, for example, where the UE 102 is being handed-off to a new base station. Specification of the previous location can come from the UE 102 by explicit definition and/or by indicating the previous location as the first in a list of ciphering location capabilities. The location can also be determined or inferred based on other factors, such as for example environmental factors and/or factors related to the type of request; the location can also change in accordance with these factors. Once the location is determined, it is sent back to the UE 102. In this regard, the UE 102 can communicate with a plurality of network types and is no longer limited by the cipher termination point. Additionally, the UE 102 can intelligently use the cipher termination location information to know when encryption must be renegotiated between the UE 102 and the core mobile network 108, base station 104, and/or base station controller 106, for example when the UE 102 is being handed-off from one base station 104 to another base station (not shown).

Figure 2:
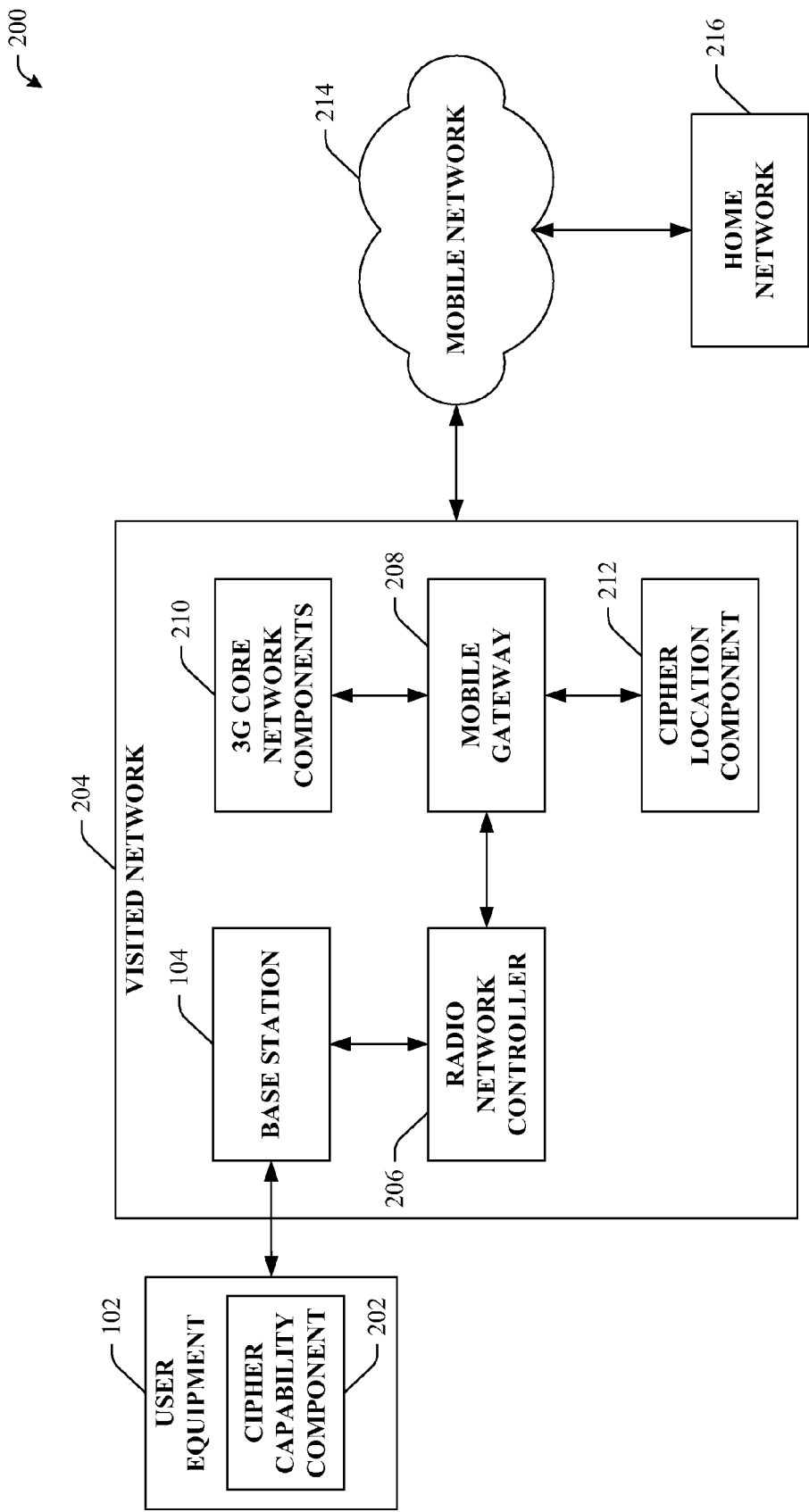
FIG. 2 illustrates an example system that facilitates selectively terminating security in a third generation (3G) network in accordance with an embodiment.

Turning now to FIG. 2, an illustration of an example system 200 that facilitates selective security termination in a 3G mobile network is presented. According to the embodiment, system 200 can include UE 102, which can comprise a cipher capability component 202 that can determine the cipher termination locations supported by the UE 102. A visited network 204 is additionally displayed having at least one base station 104 that communicates with the UE 102, a radio network controller 206 that manages a plurality of base stations, a mobile gateway 208 that can provide one or more radio network controllers 206 with access to the remainder of components of a 3G core network 210, and a cipher location component 212 that can determine a cipher termination location based on network variables and/or capabilities of the UE 102. Moreover, mobile network 214 is provided to which the visited network 204 and the home network 216 are a part, the home network 216 is the network that is home to the UE 102.

In one embodiment, the UE 102 establishes a connection with the base station 104, which belongs to visited network 204, and transmits a message to initiate a communication session. It is to be appreciated that the message can be sent following initiation of communication as well. In the message, the UE 102 provides ciphering termination location capabilities from the cipher capability component 202. Upon receiving the message, or a portion thereof, the base station 104 can leverage the radio network controller 206 of the visited network 204 to communicate the cipher capabilities to the mobile gateway 208. The mobile gateway 208 hosts a plurality of radio network controllers 206 providing access to the 3G network core components 210. Additionally, the mobile gateway 208 can call the cipher location component 212 to determine the point where the cipher will terminate in the communication between the UE 102 and the visited network 204. The cipher termination location can be determined based on a number of factors including but not limited to information specified by the cipher capability component 202 and also other factors such as type of network the UE 102 is connected to (e.g. home or visited) and environmental factors (such as location, time, mobile status, etc.) as well. In this regard, artificial intelligence can be utilized to determine such environmental factors, for example where the UE 102 is stationary (such as a home device, for example), security termination at the base station can be desirable in some cases where the UE 102 need not renegotiate ciphering due to mobility. In some cases, the network type will be used to determine the cipher termination location (e.g. 3G terminates in the radio network controller and WiMAX terminates in the base station). Once the location is determined, it can be sent back to the UE 102 and used to intelligently determine when ciphers need to be renegotiated, etc. Additionally, the location can be used to affect the behavior of the UE 102 to make it compatible with a plurality of network architectures. In this embodiment, the 3G network determines cipher termination to occur at the radio network controller 206. In this regard, compromise of the base station 104 can be of no value to a potential hacker or malicious user as the data from the UE 102 will be encrypted until it reaches a more central node, the radio network controller 206.

The location can be sent to the UE 102 from the mobile gateway 208 via the radio network controller 206 and base station 104; it will be understood that the location can sometimes be comprised in a message requesting authentication of the UE 102, for example. The UE 102 can store the location information and continue with authentication by sending a message requesting generation of encryption keys; the request message is sent back to the mobile gateway 208 via the base station 104 and radio network controller 206. The message can be using non access stratum signaling. The mobile gateway 208 can, for example, be operable to interwork the message received from UE 102 with a message forwarded to the home network 216 through the mobile network 214 to make the ultimate authentication determination and generate the encryption keys. In this regard, the home network 216 is ultimately responsible for creating secure keys to be used with the home and/or visiting networks 216, 204. The keys can be sent back to the radio network controller 206 and on to the UE 102 via the other components for use thereof in subsequent communications. In this embodiment, the keys can be radio resource control (RRC) keys utilized in conjunction with the protocol layer of the mobile network 214. After receiving the keys for the UE 102, the encryption security system is established and communication can begin. In this embodiment, the UE 102 can communicate by subsequently encrypting packets and sending them to the base station 104; the data packets remain encrypted through the base station 104 and on to the radio network controller 206, which is the cipher termination location according to the authentication request response. At the controller 206, the data is deciphered (e.g. the cipher is terminated) by utilizing the keys from the home network 216.

It is to be appreciated that the home network 216 can have substantially the same components as shown in the visited network 204. To this end, the UE 102 can connect directly to the home network 216 if within range, and keys can be generated without hitting another network via the mobile network 214 as shown in this figure. Moreover, if the cipher is to terminate centrally (e.g. in the radio network controller 206), the UE 102 can know, for example, that ciphering may not need to be renegotiated when being handed-off to another base station; this makes mobile use in the mobile network 214 more efficient when handing off and also mitigates errors in handing off, such as during renegotiation of the cipher. Additionally, if the UE 102 cannot support the cipher termination location, communication can be closed by either the UE 102 and/or the base station 104 (or other components within the network).

In another embodiment, robust header compression (ROHC) can be involved in implementing the functionality disclosed herein. In particular, packet data convergence protocol (PDCP) can be used to implement header compression. In this embodiment, the cipher termination location (or information regarding whether the device(s) utilizing the protocol support selective security termination) can be implemented in the PDCP header.

Figure 3:
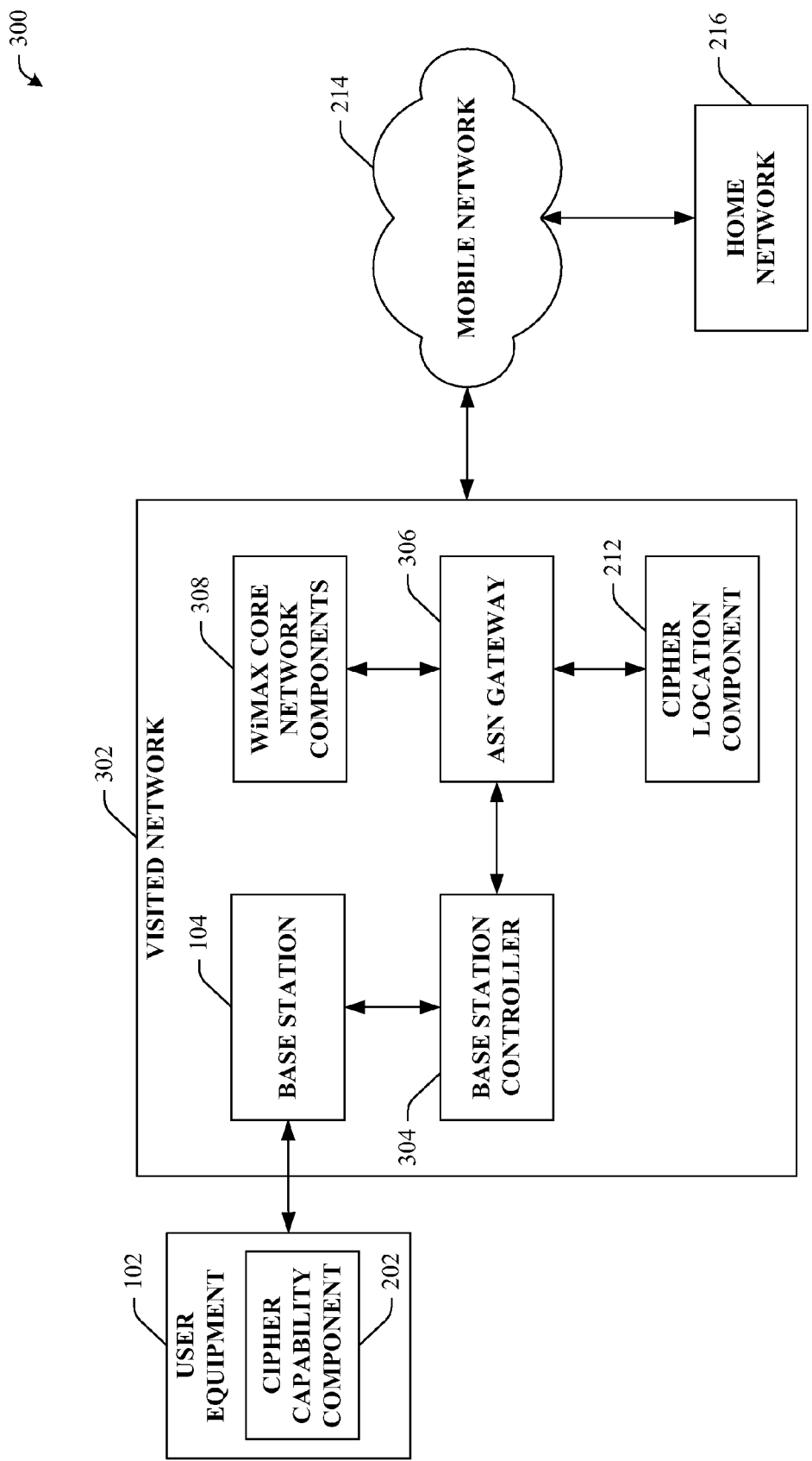
FIG. 3 illustrates yet another example system that facilitates selectively terminating Worldwide Interoperability for Microwave Access (WiMAX) mobile network security in accordance with an embodiment.

With reference now to FIG. 3, an illustration of an example system 300 that facilitates selective security termination in a WiMAX architecture. The example system 300 can include UE 102, which can comprise a cipher capability component 202 that can determine the cipher termination location(s) supported by the UE 102. A visited network 302 is additionally displayed having at least one base station 104 that communicates with the UE 102, a base station controller 304 that manages a plurality of base stations, an access service network (ASN) gateway 306 that can provide one or more base station controllers 304 with access to the remainder of components of a WiMAX core network 308, and a cipher location component 212 that can determine a cipher termination location based on network variables and/or capabilities of the UE 102. Moreover, mobile network 214 is provided to which the visited network 302 and the home network 216 are a part, the home network 216 is the network that is home to the UE 102.

In one embodiment, the UE 102 can initiate communication with a mobile network via base station 104. In the initial connection message, for example, the cipher capability component 202 can determine one or more capabilities of the UE 102 with respect to cipher termination location, and the UE 102 can send the capabilities to the base station 104. The base station 104 can forward the message and capabilities to the ASN gateway 306 via the base station controller 304, which can provide connectivity to a plurality of base stations 104, for example. The ASN gateway 306 can make a determination regarding location of cipher termination based in part on the capabilities of the UE 102 received in the message. In addition, other factors can influence the determination such as network type. It is to be appreciated that WiMAX networks can desire cipher termination at the base station 104 level since further communication is protected in the network by utilizing extensible authentication protocol (EAP) to communicate encrypted packets from the UE 102 to the home network 216. In this regard, the ASN gateway can leverage the cipher location component 212 to make the determination of where to terminate the cipher as described above. The determined location can be sent back to the UE 102 in an authentication request, for example. Upon receiving the request, the UE 102 can store the cipher termination location for subsequent use.

Additionally, the UE 102 can determine the cipher terminating at the base station 104, respond with requested authentication credentials, and additionally request encryption key generation. The response comprising the request is sent to the home network 216 through the plurality of components as described above where authentication is challenged and encryption/decryption keys are generated. The keys are sent back with a security mode to the visited network 302 for use therein. The components of the WiMAX core network 308 forward the encryption keys to the ASN gateway 306, which submits the keys to the base station 104 via the base station controller 304 for subsequent cipher termination if such is desired at the base station 104 level. In this embodiment, the keys can be layer 1 keys that facilitate encryption at the physical network layer. Subsequently, the UE 102 can communicate with the visited network 302 via the base station 104 by encrypting packets, at the protocol layer for example, upon sending to the base station 104. The base station can terminate the cipher—e.g. decrypt the data packets—and send the data packets to the base station controller 304 for processing in the mobile network.

In one embodiment, following authentication and cipher termination location determination, where the termination is in base station 104 for example, the UE 102 can communicate with a WLAN router or equipment using EAP over local area network (LAN). The router can subsequently communicate to the base station 104 using EAP over remote authentication dial in user service (RADIUS); it is to be appreciated that the router is not required, the UE 102 can communicate directly to the base station 104 using EAP over LAN and/or the UE 102 can be the router having one or a plurality of connected clients. In this embodiment, the base station 104 terminates the WiMAX cipher and can wrap the communication (message, packet, or other data, for example) in a secondary security protocol for protected processing within the mobile network 214. The second security protocol message can be sent to the visited network 302 and processed by the network without having to communicate with the home network 216 in subsequent requests. In one embodiment, this security protocol message can be transported between and/or throughout the networks 216 and 302 via a control/management protocol as well, such as an authentication, authorization, and accounting (AAA) protocol, for example.

In another embodiment, the UE 102 can utilize the cipher termination location information in subsequent hand-offs to determine behavior in the new base station 104. For example, if the ciphering was terminated in the base station previously, it may need to be renegotiated in the new base station during hand-off. Additionally, if the new base station is controlled by the same controller 304 and if the controller 304 stored the decryption keys, the controller 304 can send the keys down to the new base station during hand-off upon the UE 102 requesting communication with the new base station; thus, the UE 102 need not request key generation. In this regard, this information can be sent to the UE 102 as part of the cipher termination location information in one embodiment. The UE 102 can also use the cipher termination location to specify a desired location via the cipher capability component 202 upon making an initial request to a base station 104 (such as a new base station). For example, where the current cipher is terminated centrally, the UE 102 can specify central cipher termination as its preferred mode since if the new base station is controlled by the same base station controller 304 as the old base station 104, the cipher may not need to be renegotiated.

In another embodiment, utilizing either a 3G, WiMAX, or other type of mobile network, a user can have a home/residential base station connected to stationary and/or mobile home equipment as mentioned above. The user can be mobile using a handset, for example, and can desire to access equipment connected to the home base station (such as a DVR, camera, home monitoring system, and the like, for example). The user can utilize the handset and attempt to have a base station 104 terminate ciphering such that the user can directly access connected equipment bypassing the centralized nodes of the network where the cipher would normally be terminated. In this regard, the access to the home base station need not be deciphered by the central components allowing faster and more reliable access to the home base station and equipment attached thereto. Additionally, perhaps the centralized nodes are not equipped to process the request, or the request can be proprietary to the home base station. The request can still be processed in this embodiment as the centralized components are bypassed.

Figure 4:
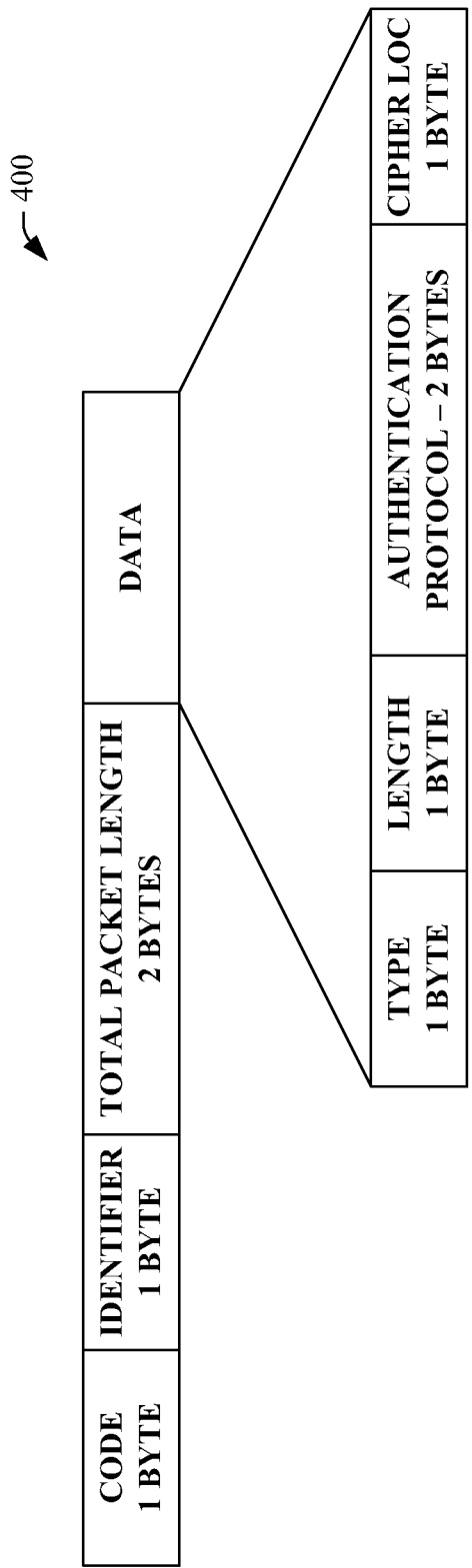
FIG. 4 illustrates an example protocol specification in accordance with an embodiment.

Now turning to FIG. 4, an example protocol specification 400 is displayed in accordance with an embodiment of the subject matter disclosed herein. For example, the protocol shown is similar to an EAP configuration negotiation packet as described supra with respect to initiating communication with a base station in a WiMAX configuration and/or receiving the authentication request from the mobile network. It is to be appreciated that this is just one example embodiment, and the termination location capabilities as disclosed can be communicated in other protocols, other packet specifications, and other mobile networks. The protocol specification 400 can have various data values corresponding to a request for communication with a base station including a code that identifies the type of packet (request, response, success, failure, etc.) as well as an identifier that can be used in request/response (e.g. to match the response to the request). Additionally, a length of the packet is provided followed by the data relevant to the request. In this embodiment, the data comprises information about the authentication protocol as well as a type and length of the data. Additionally, a cipher location can be specified in the data as well to indicate either the cipher locations capable in the UE (if the message is sent to the base station from the UE to initiate communication). Additionally, where the message is the authentication request in response to the communication initiation message, the cipher location information in the protocol specification 400 can be that chosen by a component of the mobile network; the UE can store the location for subsequent use/evaluation.

Figure 5:
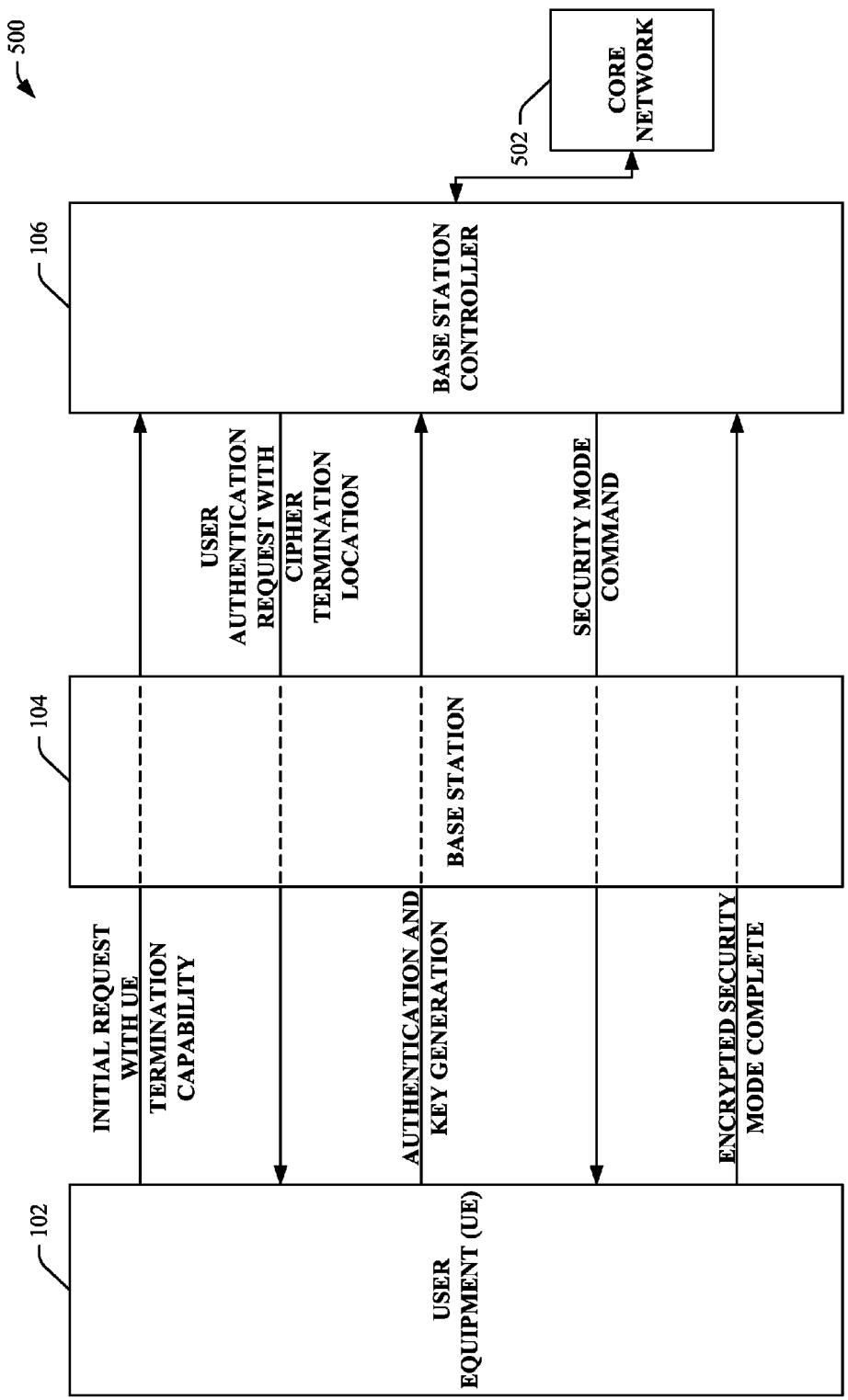
FIG. 5 illustrates an example system that facilitates terminating mobile network security at a centralized node in accordance with an embodiment.

Referring to FIG. 5, an example system 500 that facilitates cipher location determination and negotiation is displayed along with a series of messages between the various components. A UE 102 is provided that requests communication with a mobile network specifying compatible cipher termination location(s) along with a base station 104 that facilitates communicating between the UE and a base station controller 106. Additionally, the base station controller 106 can communicate with a core network 502 also provided. In this embodiment, the UE 102 can send a message to the base station 104 to initiate communications with a mobile network. The message comprises cipher termination capability of the UE 102 as shown herein. The capability can be one or more cipher termination location capabilities, a list of capabilities and/or an enumeration or byte specification corresponding to the capabilities for example. The request is forwarded to the base station controller 106 where the base station controller 106 can utilize the cipher termination location capabilities in determining a location for the cipher termination of the current communication. Additionally or alternatively, one or more components in the core network 502 or other gateway component can determine the cipher termination location utilizing the capability information. After determining the location of the cipher termination, the base station controller 106 can send the location back to the UE 102 via the base station 104 along with an authentication request. It is to be appreciated that the mobile network can also request the UE 102 determine the cipher termination location by sending back a list to choose from in the authentication request in one embodiment.

Upon receiving the request for authentication and the cipher termination location, the UE 102 can store the termination location and respond to the request for authentication requesting encryption key generation as well from the mobile network. In the aforementioned embodiment, the UE 102 can specify the cipher termination location desired from the list provided by the base station controller 106. Upon request for key generation, the core network 502 can authenticate the UE 102 (which can involve accessing other components within the network, for example, or even a home network) and generate encryption and/or decryption keys for subsequent communication. The keys are pushed (or pulled, for example) back to the base station controller 106, in this embodiment, and to the UE 102 in a security mode message. In this embodiment, the cipher termination is centrally located in the base station controller 106, and subsequent communication can ensue from the UE 102 to the base station 104 (and on to the base station controller 106) by encrypting the data according to the keys. The base station 104 passes the communication to the base station controller 106 where it is decrypted using the keys provided. This facilitates centralized cipher termination such that communication is protected from the UE 102 onto the base station controller 106. As mentioned, this is beneficial in networks, such as 3G, where base stations are becoming increasingly commonly located in low security areas and no other encryption/authentication protocols are implemented to protect the data.

Figure 6:
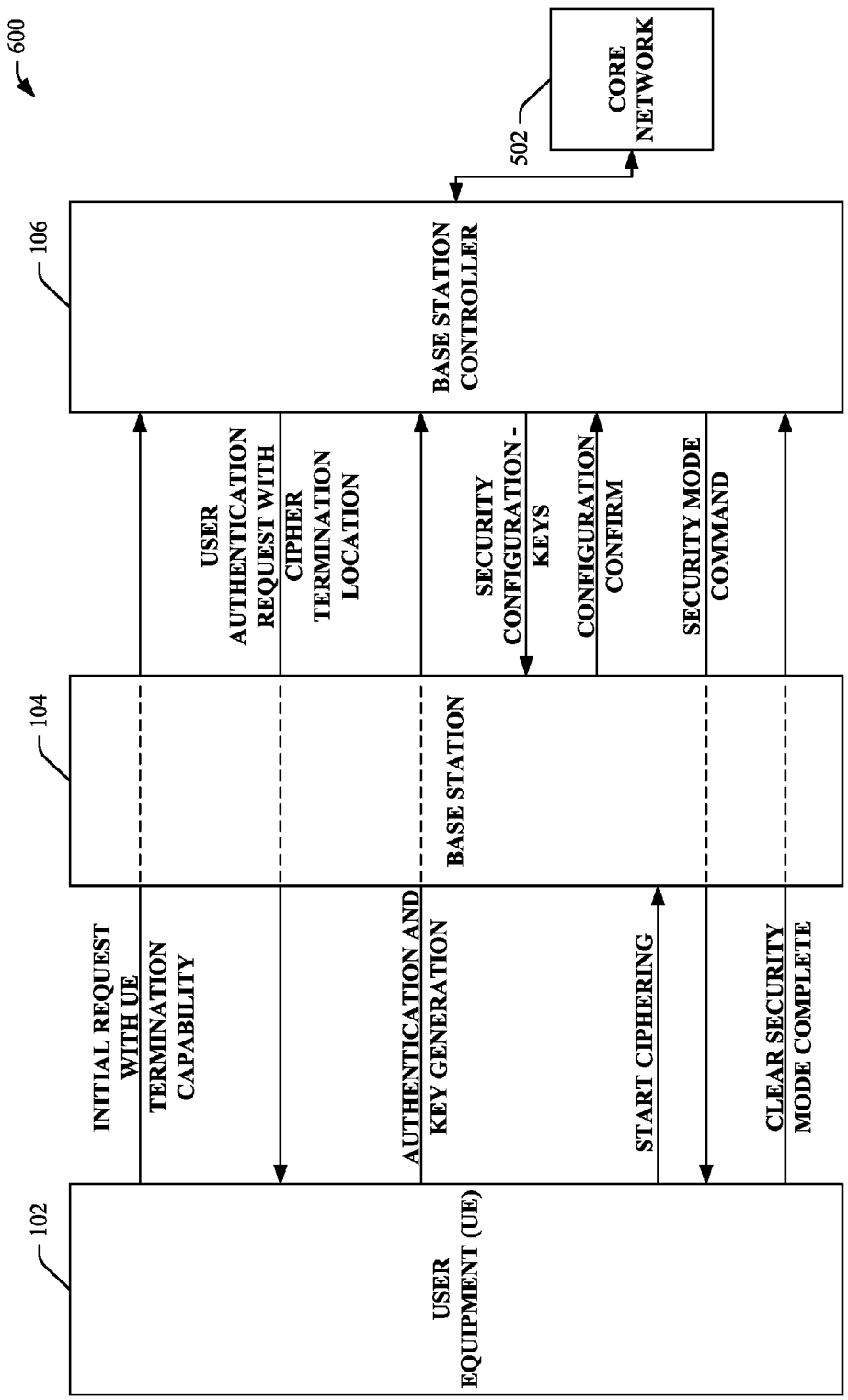
FIG. 6 illustrates an example system that facilitates terminating mobile network security at a base station in accordance with an embodiment.

Turning now to FIG. 6, an example system 600 that facilitates selective cipher termination location is displayed in accordance with the subject matter described; specifically, this embodiment selects cipher termination to occur in the base station 104. A UE 102 is provided that requests communication with a mobile network specifying compatible cipher termination location(s) along with a base station 104 that facilitates communicating between the UE 102 and a base station controller 106. Additionally, the base station controller 106 can communicate with a core network 502 also provided. In this embodiment, the UE 102 can send a message to the base station 104 to initiate communications with a mobile network. The message comprises cipher termination capability of the UE 102 as shown herein. The capability can be one or more cipher termination location capabilities, a list of capabilities and/or an enumeration or byte specification corresponding to the capabilities for example. The request is forwarded to the base station controller 106 where the base station controller 106 can utilize the cipher termination location capabilities in determining a location for the cipher termination of the current communication. Additionally or alternatively, one or more components in the core network 502 or other gateway component (not shown) can determine the cipher termination location utilizing the capability information. After determining the location of the cipher termination, the base station controller 106 can send the location back to the UE 102 via the base station 104 along with an authentication request. It is to be appreciated that the mobile network can also request the UE 102 determine the cipher termination location by sending back a list to choose from in the authentication request in one embodiment.

Upon receiving the request for authentication and the cipher termination location, the UE 102 can store the termination location and respond to the request for authentication requesting encryption key generation as well from the mobile network. In the aforementioned embodiment, the UE 102 can specify the cipher termination location desired from the list provided by the base station controller 106. Upon request for key generation, the core network 502 can authenticate the UE 102 (which can involve accessing other components within the network, for example, or even a home network) and generate encryption and/or decryption keys for subsequent communication. The keys are pushed back to the base station controller 106 and on to the base station 104 for future cipher termination. The base station 104 can confirm the encryption key(s) with the base station controller 106 (and the core network 502); subsequently, the UE 102 can begin encrypting data sent to the base station 104. A security mode command can be sent back to the UE 102 through the base station 104 as well at which point the security setup is completed. The ULE 102 can communicate with the mobile network via the base station where the cipher is terminated at the base station 104. It is to be appreciated that the mobile network can have other protocols/policies to protect the data in this regard, and terminating the cipher at the base station 104 can be more efficient than terminating centrally.

Figure 7:
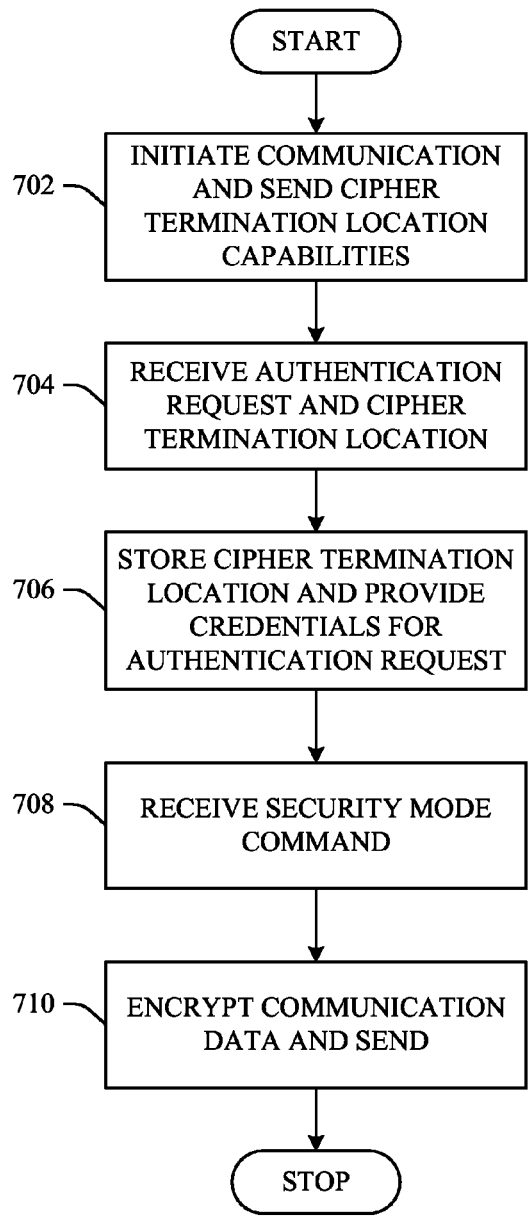
FIG. 7 illustrates a flow chart of an example methodology that facilitates specifying cipher termination capabilities and receiving a cipher location in accordance with an embodiment.
Figure 8:
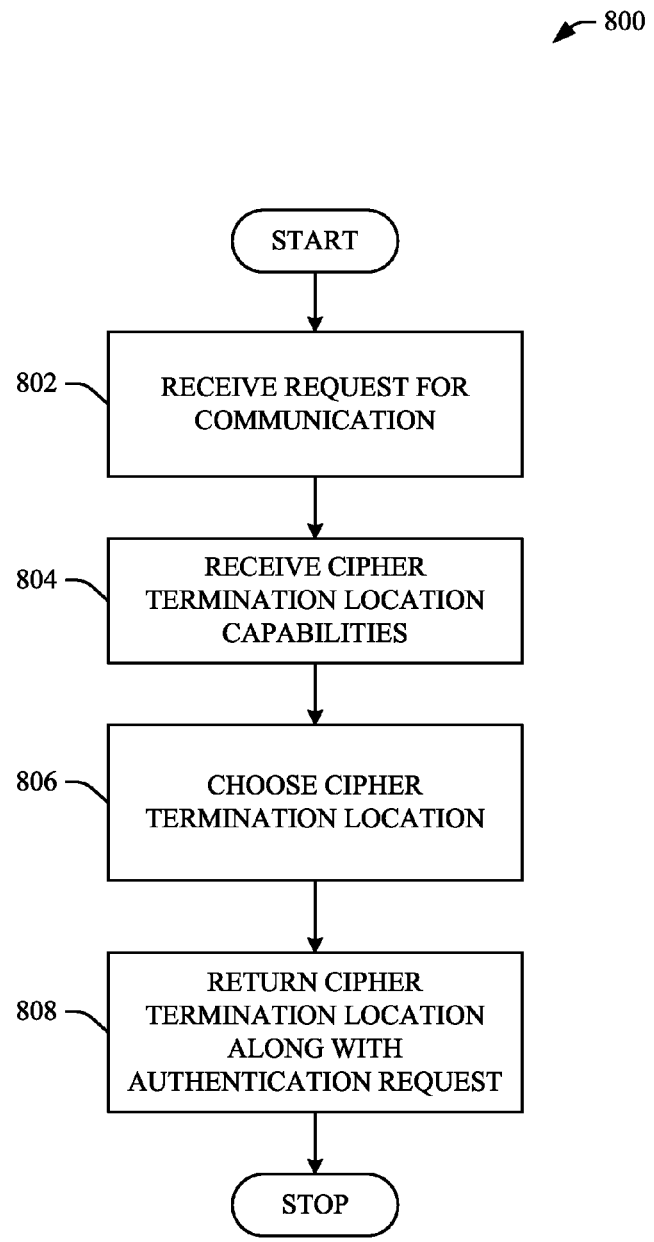
FIG. 8 illustrates a flow chart of an example methodology that facilitates choosing a cipher termination location in accordance with an embodiment.
Figure 9:
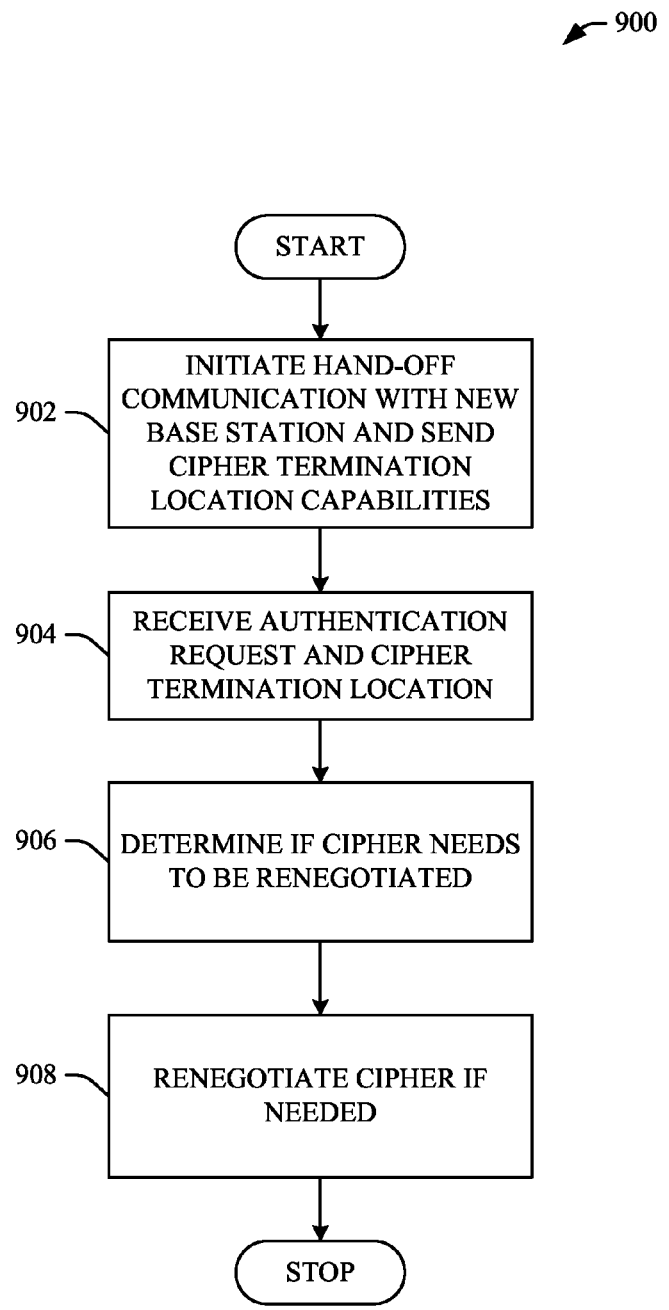
FIG. 9 illustrates a flow chart of an example methodology that facilitates cipher state determination during a hand-off in accordance with an embodiment.

FIGS. 7-9 illustrate methodologies in accordance with the subject disclosure. For simplicity of explanation, the methodologies are depicted and described as a series of acts. It is to be understood and appreciated that the subject disclosure is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates an example methodology 700 of initiating handset communication with a mobile network in accordance with an embodiment. At 702, a handset (or other UE) initiates communication (such as with a base station in a mobile network, for example) and specifies cipher termination location capabilities. It is to be appreciated that the handset may not have any such capabilities and communicate such to the base station. In this embodiment, however, the capabilities are sent to a base station, for example, and can comprise one or more capabilities, a list of capabilities, and/or an enumeration or byte specification of available cipher termination location functionalities. At 704, a request for authentication is received from the mobile network along with the chosen cipher termination location. The location can be at the base station and/or a location more central in the network such as a base station controller or comparable component, a mobile gateway, or somewhere deep within the network. At 706, the cipher termination location information is stored in the handset, and a response is sent to the authentication request identifying the handset, for example. At 708, a security mode command is received indicating what encryption and/or authentication is to be used in subsequent requests to the network. At 710, such communication ensues and is encrypted as specified and sent (such as to a base station). It is to be appreciated that the mobile network can choose the cipher termination location as well as any authentication or other encryption methods that are to be used.

FIG. 8 illustrates an example methodology 800 for specifying a cipher termination location in accordance with an embodiment. At 802, a request for communication is received; the request can initiate from a UE, for example, and the request can specify cipher termination location capabilities at 804. The capabilities are the cipher termination locations the UE can support. This can be a list of nodes, a group of nodes (such as at a given level, for example), an enumeration, a bit-set, and the like. A cipher termination location can be chosen at 806. The determination can be made based on the capabilities; for example, the capabilities can list a preferred cipher termination location (such that, for example, a list can be ordered according to preference). It is to be appreciated that the determination can be made that does not include a location in the list of capabilities and the UE, for example, can approve the location if it can support the location, but did not initially request it, for example. The determination can take other factors into account as well, such as network type (3G may prefer termination in a central node where WiMAX may prefer a base station termination of the cipher), network load (if different components exist, for example, that terminate the cipher at different locations), a preference of the mobile network, environmental factors and/or the like. At 808, the cipher termination location is returned along with a request for authentication.

FIG. 9 illustrates an example methodology 900 for determining if a cipher should be renegotiated during a hand-off is illustrated in accordance with an embodiment. As a mobile device or UE moves from area to area, a hand-off can be required to switch communication to another base station to ensure reliability. At 902, a hand-off communication is initiated with a new base station and cipher termination location capabilities are sent along with the communication. At 904, a request for authentication is received from the new base station along with a cipher termination location. At 906, the cipher termination location can be used to determine if the cipher needs to be renegotiated. For example, if the previous cipher termination location stored in the UE was at a central node (such as a radio network controller) and the new base station provides the same cipher termination location, the cipher may not need to be renegotiated. This can be determined according to this and other factors, for example (such as if the cipher termination node is within the same network as well). At 908, the cipher can be renegotiated if necessary to utilize the new base station.

As utilized herein, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Artificial intelligence (AI) based systems (e.g., explicitly and/or implicitly trained classifiers) can be employed in connection with performing inference and/or probabilistic determinations and/or statistical-based determinations as in accordance with one or more aspects of the disclosed subject matter as described herein. As used herein, the term "inference," "infer" or variations in form thereof refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the disclosed subject matter. For example, as described above, AI can be used to determine environmental factors affecting the termination location. Additionally, AI can be used to aggregate other factors, such as termination specification from other similar UEs, to decide on a termination location. It is to be appreciated that many aspects of the subject matter described herein can utilize AI to achieve many ends to make the functionalities more desirable in a user environment.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter.

Some portions of the subject disclosure have been presented in terms of algorithms and/or symbolic representations of operations or components within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 10:
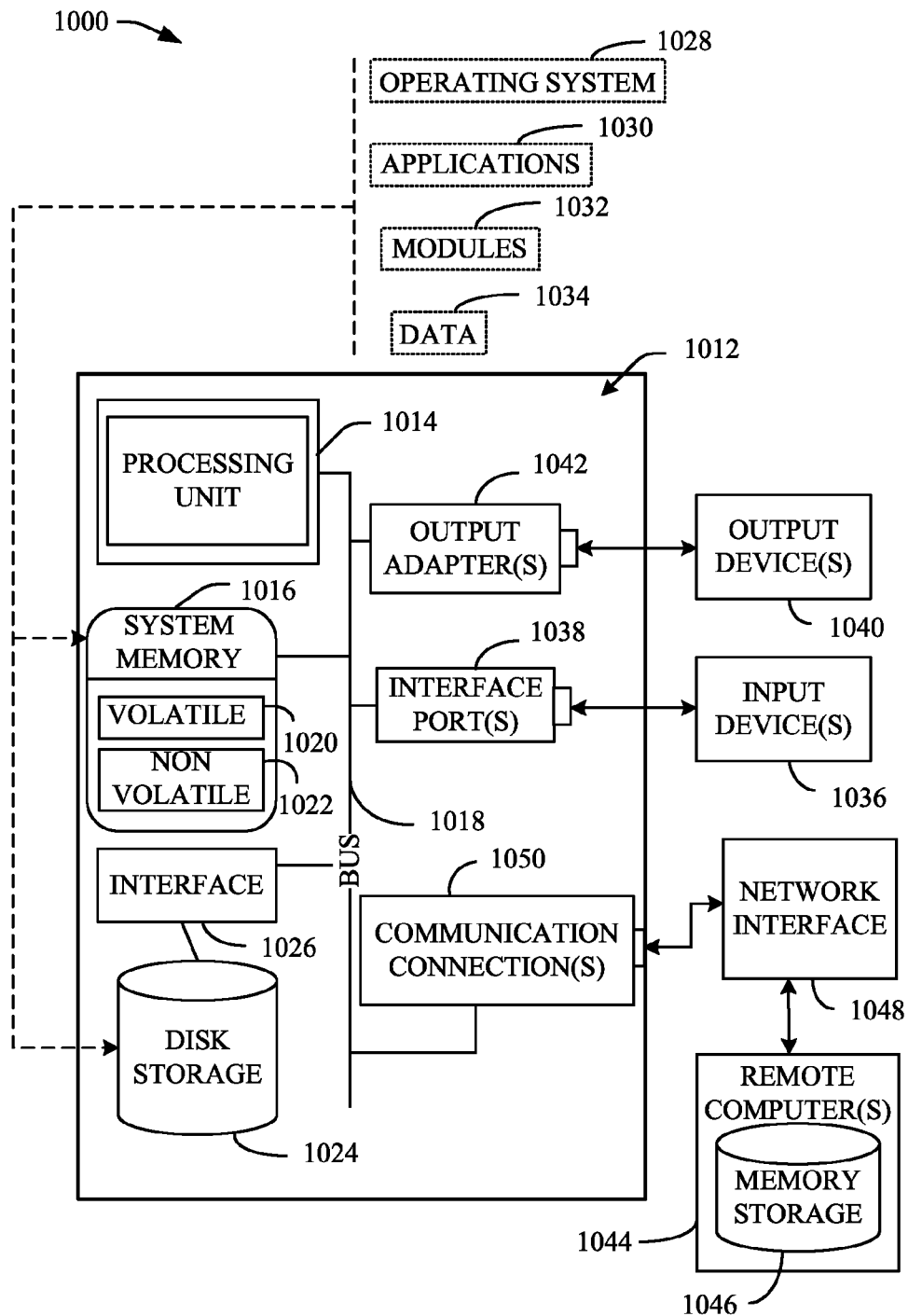
FIG. 10 is a schematic block diagram that illustrates an example of a suitable operating environment.
Figure 11:
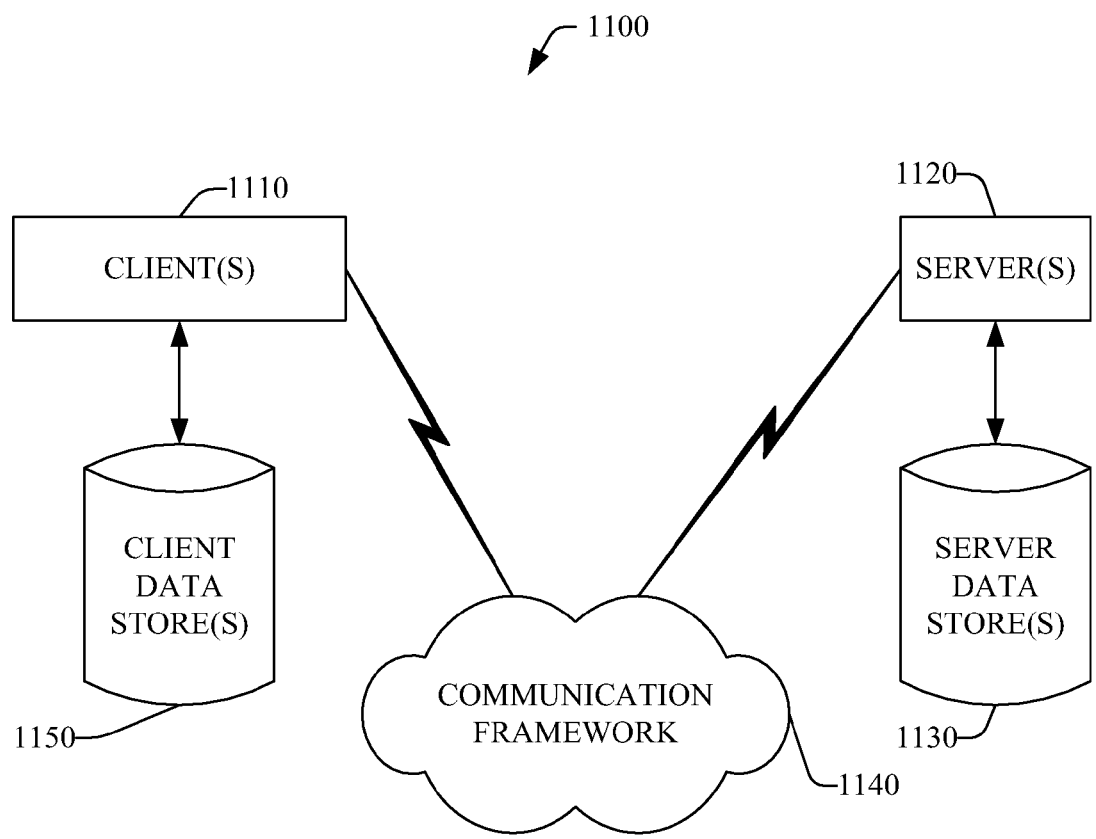
FIG. 11 is a schematic block diagram that illustrates an example of a sample-computing environment.

In order to provide a context for the various aspects of the disclosed subject matter, FIGS. 10 and 11 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, handheld computing devices (e.g., PDA, phone, watch), microprocessor-based or programmable consumer or industrial electronics, and the like. The illustrated aspects may also be practiced in distributed computing environments where tasks are performed by remote processing devices that are linked through a communications network. However, some, if not all aspects of the claimed innovation can be practiced on stand-alone computers. In a distributed computing environment, program modules may be located in both local and remote memory storage devices.

With reference to FIG. 10, a suitable environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The computer 1012 can be used, for example, to implement one or more of the mobile network components as described herein, such as a base station controller, mobile gateway, and/or the core network components (such as for 3G and WiMAX networks, for example).

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include ROM, PROM, electrically programmable ROM (EPROM), electrically erasable programmable ROM (EEPROM), or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/nonvolatile computer storage media. FIG. 10 illustrates, for example, a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used, such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the disclosed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereof, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

FIG. 11 is a schematic block diagram of a sample-computing environment 1100 with which the subject disclosure can interact. The system 1100 includes one or more client(s) 1110. The client(s) 1110 can be hardware and/or software (e.g., threads, processes, computing devices). The system 1100 also includes one or more server(s) 1130. Thus, system 1100 can correspond to a two-tier client server model or a multi-tier model (e.g., client, middle tier server, data server), amongst other models. The server(s) 1130 can also be hardware and/or software (e.g., threads, processes, computing devices). The servers 1130 can house threads to perform transformations by employing the subject innovation, for example. One possible communication between a client 1110 and a server 1130 may be in the form of a data packet transmitted between two or more computer processes.

The system 1100 includes a communication framework 1150 that can be employed to facilitate communications between the client(s) 1110 and the server(s) 1130. The client(s) 1110 are operatively connected to one or more client data store(s) 1160 that can be employed to store information local to the client(s) 1110. Similarly, the server(s) 1130 are operatively connected to one or more server data store(s) 1140 that can be employed to store information local to the servers 1130. In one example, the client 1110 can be a UE desiring access to server 1120, which can be substantially any device connected to a mobile network; the mobile network can be the communication framework 1140, and the client 1110 can utilize the framework 1140 to communicate with the server 1120, for example.

What has been described above includes examples of aspects of the subject disclosure. It is, of course, not possible to describe every conceivable combination of components or methodologies for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. An apparatus, comprising:
 a component that receives at least one cipher termination location capability to be supported by a cipher termination location where encrypted communications from a user equipment (UE) are decrypted by terminating a cipher related to the UE; and
 a cipher location component including a computer, the cipher location component operating to automatically determine the cipher termination location in a wireless mobile network for terminating the cipher related to the UE by verifying that a device associated with the determined cipher termination location is compatible with the at least one cipher termination location capability, so that the encrypted communications from the UE to the wireless mobile network are decrypted at the determined cipher termination location, the device associated with the determined cipher termination location being configured to provide corresponding decrypted communications by terminating the cipher related to the UE.

2. The apparatus of claim 1, wherein the determined cipher termination location is a radio network controller of the wireless mobile network, and the radio network controller operates in conjunction with one or more base stations.

3. The apparatus of claim 1, wherein the determined cipher termination location is a base station of the wireless mobile network that communicates directly with the UE.

4. The apparatus of claim 1, wherein the UE sends an initial configuration packet that specifies the at least one cipher termination location capability.

5. The apparatus of claim 1, wherein information for the determined cipher termination location is delivered to the UE along with an authentication request.

6. The apparatus of claim 5, wherein the UE requests generation of at least one cipher key, and the cipher key is generated and sent to the determined cipher termination location for subsequent cipher termination.

7. The apparatus of claim 1, wherein the at least one cipher termination location capability specifies at least one encryption scheme to be supported by the determined cipher termination location.

8. The apparatus of claim 1, wherein the at least one cipher termination location capability specifies a security condition that includes decrypting the encrypted communications at a centralized location in the wireless mobile network.

9. The apparatus of claim 1, wherein
when a connection for the UE is transferred from a first base station to a second base station in the wireless mobile network and the determined cipher termination location is more central to the wireless mobile network than both the first base station and the second base station, the cipher location component operates to maintain the cipher termination location when the UE is handed off from the first base station to the second base station.

10. A method, comprising:
receiving information for at least one cipher termination location compatible with a user equipment (UE) in a wireless mobile network, the at least one compatible cipher termination location supporting a ciphering capability so that encrypted communications from the UE are decrypted at the at least one compatible cipher termination location by terminating a cipher related to the UE;
determining a cipher termination location in the wireless mobile network for cipher termination by verifying that a device associated with the determined cipher termination location is consistent with the ciphering capability of the at least one compatible cipher termination location, so that encrypted communications from the UE to the wireless mobile network are decrypted at the determined cipher termination location, the device associated with the determined cipher termination location being configured to provide corresponding decrypted communications by terminating the cipher related to the UE; and
forwarding information for the determined cipher termination location to the UE.

11. The method of claim 10, wherein the wireless mobile network is a third generation (3G) network and the determined cipher termination location is a radio network controller of the 3G network.

12. The method of claim 10, wherein the wireless mobile network is a Worldwide Interoperability for Microwave Access (WiMAX) network and the determined cipher termination location is a base station of the WiMAX network.

13. The method of claim 10, further comprising:
generating encryption/decryption keys for subsequent cipher termination on behalf of a request from the UE; and
sending the keys to the determined cipher termination location in the wireless mobile network.

14. The method of claim 10, further comprising sending information for the determined cipher termination location to the UE in response to a request to initiate communication from the UE.

15. The method of claim 14, wherein the request to initiate communication comprises the at least one cipher termination location compatible with the UE.

16. The method of claim 14, further comprising decrypting data communicated by the UE at the determined cipher termination location.

17. The method of claim 10, wherein the determined cipher termination location is a centralized node in the wireless mobile network.

18. An apparatus, comprising:
a cipher capability component including a computer, the cipher capability component operating to determine at least one cipher termination location capability to be supported by a device associated with a compatible cipher termination location where encrypted communications from a user equipment (UE) are decrypted by terminating a cipher related to the UE, so that the encrypted communications from the UE to a wireless mobile network are decrypted in the wireless mobile network at the compatible cipher termination location in accordance with the at least one cipher termination location capability, the device associated with the compatible cipher termination location being configured to provide corresponding decrypted communications by terminating the cipher related to the UE; and
a component that sends the at least one cipher termination location capability to a base station of the wireless mobile network.

19. The apparatus of claim 18, wherein the at least one cipher termination location capability is sent to the base station along with an initial communications request.

20. The apparatus of claim 18, wherein information for a cipher termination location determined by the wireless mobile network is received from the base station.

21. The apparatus of claim 20, wherein generation of a cipher key is requested to the wireless mobile network, and the cipher key is sent to the determined cipher termination location upon generation.

22. The apparatus of claim 20, wherein the UE determines whether a communication channel must be established with a new base station based at least in part on the received cipher termination location.

23. A method, comprising:
using a communication device to send a request to initiate communication with a wireless mobile network;
specifying in the request at least one compatible cipher termination location that supports a ciphering capability so that encrypted communications from the communication device are decrypted at the at least one compatible cipher termination location by terminating a cipher related to the communication device; and
receiving a response from the wireless mobile network, wherein the response specifies a chosen cipher termination location that is consistent with the ciphering capability of the at least one compatible cipher termination location, so that encrypted communications from the communication device to the wireless mobile network are decrypted at the chosen cipher termination location by a device associated with the chosen cipher termination location, the device associated with the chosen cipher termination location being configured to provide corresponding decrypted communications by terminating the cipher related to the communication device.

24. The method of claim 23, further comprising storing information for the chosen cipher termination location, wherein the location is subsequently used to determine a security state with respect to the wireless mobile network.

25. The method of claim 23, wherein the response requests authentication.

26. The method of claim 23, further comprising encrypting communication with the wireless mobile network, wherein the communication is decrypted at the chosen cipher termination location.

27. The method of claim 23, wherein the chosen cipher termination location is a base station of the wireless mobile network that communicates directly with user equipment.

28. The method of claim 23, wherein the chosen cipher termination location is a radio network controller of the wireless mobile network that operates in conjunction with one or more base stations.

* * * * *